US010839314B2

(12) United States Patent
Subramanian et al.

(10) Patent No.: US 10,839,314 B2
(45) Date of Patent: Nov. 17, 2020

(54) AUTOMATED SYSTEM FOR DEVELOPMENT AND DEPLOYMENT OF HETEROGENEOUS PREDICTIVE MODELS

(71) Applicant: Infosys Limited, Bangalore (IN)

(72) Inventors: Ganapathy Subramanian, Bangalore (IN); Sudipto Shankar Dasgupta, Bangalore (IN); Kiran Kumar Kaipa, Bangalore (IN); Prasanna Nagesh Teli, Kolhapur (IN)

(73) Assignee: Infosys Limited, Bangalore (IN)

( * ) Notice: Subject to any disclaimer, the term of this patent is extended or adjusted under 35 U.S.C. 154(b) by 829 days.

(21) Appl. No.: 15/473,285

(22) Filed: Mar. 29, 2017

(65) Prior Publication Data

US 2018/0075357 A1 Mar. 15, 2018

(30) Foreign Application Priority Data

Sep. 15, 2016 (IN) .............................. 201641031540

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| 5,727,128 | A | 3/1998 | Morrison |
| 6,243,696 | B1 | 6/2001 | Keeler et al. |
| 7,499,897 | B2 | 3/2009 | Pinto et al. |
| 7,725,300 | B2 | 5/2010 | Pinto et al. |
| 7,801,836 | B2 | 9/2010 | Sureka |
| 7,831,416 | B2 | 11/2010 | Grichnik et al. |
| 8,533,222 | B2 | 9/2013 | Breckenridge et al. |
| 8,595,154 | B2 | 11/2013 | Breckenridge et al. |
| 8,751,273 | B2 | 6/2014 | Pinto et al. |

(Continued)

OTHER PUBLICATIONS

Vilalta, "Using Meta-Learning to Support Data Mining", pp. 31-45, vol. 1, International Journal of Computer Science and Applications (Year: 2200).*

(Continued)

*Primary Examiner* — Ann J Lo
*Assistant Examiner* — Van C Mang
(74) *Attorney, Agent, or Firm* — Klarquist Sparkman, LLP

(57) ABSTRACT

A method and/or system for heterogeneous predictive models generation based on sampling of big data is disclosed. The method involves receiving a dataset and a target column associated with the dataset at a data processing engine from a distributed data warehouse. One or more columns associated with the dataset are classified at the data processing engine as a categorical column or a continuous column. One or more parameters in the dataset are identified to extract a sample data from the dataset. The sample data from the dataset is extracted based on the identified one or more parameters. One or more rank ordered machine learning algorithms are recommended to one or more users, to generate one or more predictive models from the sample data. One or more heterogeneous predictive models are generated based on the rank ordered algorithm through one or more iterations.

15 Claims, 9 Drawing Sheets

(56) References Cited

U.S. PATENT DOCUMENTS

| | | | |
|---|---|---|---|
| 8,762,299 B1 * | 6/2014 | Breckenridge | G06K 9/6227 706/12 |
| 8,909,568 B1 | 12/2014 | Mann et al. | |
| 9,189,747 B2 | 11/2015 | Mann et al. | |
| 9,239,986 B2 | 1/2016 | Lin et al. | |
| 2002/0127529 A1 | 9/2002 | Cassuto et al. | |
| 2004/0030667 A1 | 2/2004 | Xu et al. | |
| 2006/0161403 A1 | 7/2006 | Jiang et al. | |
| 2015/0379072 A1 * | 12/2015 | Dirac | G06N 20/00 707/693 |

OTHER PUBLICATIONS

Shaharanee, "Ascertaining Data Mining Rules Using Statistical Approaches ", pp. 181-189, 2009 (Year: 2009).*

Frydman, "Model Selection in Data Mining: A Statistical Approach", pp. 65-74, 2005 (Year: 2005).*

Tiago R.L. dos Santos, "Categorical data clustering: What similarity measure to recommend?", Elsevier, pp. 1247-1260, 2014 (Year: 2014).*

Mainisha S, "Predictive model for online advertising using Spark Machine Learning Pipelines," https://developer.ibm.com/spark/blog/2016/02/22/predictive-model-for-online-advertising-using-spark-machine-learning-pipelines/, Feb. 22, 2016, 12 pages.

Munirathinam et al., "Predictive Models for Equipment Fault Detection in the Semiconductor Manufacturing Process," *LACSIT International Journal of Engineering and Technology*, vol. 8, No. 4, Aug. 2016, 13 pages.

* cited by examiner

FIGURE 7

AUTOMATED SYSTEM FOR DEVELOPMENT AND DEPLOYMENT OF HETEROGENEOUS PREDICTIVE MODELS

FIELD

The field generally relates to a field of analytics on big data. In particular, the present disclosure relates to a method and a system to automatically build and deploy heterogeneous predictive models for big data in a distributed environment.

BACKGROUND

Today, enterprises are looking at leveraging data analytics at scale to monetize diverse data sources in an enterprise landscape. The rapid development of open source technologies addresses each step of the data analytics journey that the enterprises are embarking on. However, challenges still exist across phases, and enterprises are looking for cost effective solutions that meet business objectives.

One of the key focus areas is analytics on big data. With open source tools available, enterprises are able to tap into insights that were not possible without the current technologies. But new technologies also have brought in new challenges, like building robust and reliable predictive models on big data. Typically, predictive modelling is an iterative process that is time consuming and resource consuming.

Traditional predictive development process depends largely on human intervention for most of its steps, making it error prone, time consuming and cost ineffective. Though existing predictive modelling techniques provide required functionality, they fail in terms of scale, efficiency and cost. A typical modelling activity involves sampling/segmentation of data to build a good representative predictive/machine learning model. The available sampling techniques fail to extract the most appropriate representative sample of the data. Hence, larger chunks of data is used for training in order to cover all possible data characteristics. In case of big datasets, this becomes a distinct challenge due to size of data. Therefore, there is a need to build a robust system to handle the above mentioned problems.

SUMMARY

Disclosed are a method, a system and/or a non-transitory computer-readable storage medium for automated development and deployment of predictive/machine learning models for larger datasets.

In one aspect, a computer-implemented method for heterogeneous predictive models generation based on sampling of big data is disclosed. The method involves receiving a dataset and a target column associated with the dataset at a data processing engine, from one or more distributed data warehouses located in multiple geographic regions. The one or more distributed data warehouses are communicatively coupled to the data processing engine through a high throughput distributed messaging system over a cluster computing network. One or more columns associated with the dataset are classified at the data processing engine as a categorical column or a continuous column, based on at least one of a type of data or a distribution of data in the dataset. One or more parameters in the dataset are identified to extract a sample data from the dataset. The one or more parameters may be one or more of selected categorical columns, a target column or one or more decile columns. The one or more decile columns may be a decile level representation of values of each of the selected continuous columns.

The sample data from the dataset is extracted based on the identified one or more parameters. One or more rank ordered machine learning algorithms are recommended to one or more users, to generate one or more predictive models based on the sample data.

The recommendation may be based on characteristics of the dataset. One or more heterogeneous predictive models are generated based on the rank ordered algorithm through one or more iterations.

Further, the generated one or more heterogeneous predictive models are deployed automatically by dividing the dataset into smaller chunks based on the size of the dataset, predicting the outcome of the target column, and persisting the outcome in the distributed data warehouse, through a bulk data transferring tool.

In another aspect, a system for heterogeneous predictive models generation based on sampling of big data is disclosed. The system comprise a cluster computing network with one or more communicatively coupled nodes, a high throughput distributed messaging system, a distributed data warehouse, a bulk data transferring tool, a data processing engine, an analytical engine, at least one processor, at least one memory unit communicatively coupled to at least one processor over the cluster computer network.

The one or more processors are configured to receive a dataset and a target column associated with the dataset at a data processing engine, from one or more distributed data warehouses located in multiple geographic regions. The one or more distributed data warehouses are communicatively coupled to the data processing engine through the high throughput distributed messaging system over a cluster computing network. The one or more processors classify one or more columns associated with the dataset at a data processing engine as a categorical column or a continuous column, based on at least one of a type of data or a distribution of data in the dataset. The one or more processors further identify one or more parameters in the dataset to extract a sample data from the dataset. The one or more parameters may be one or more of selected categorical columns, a target column or one or more decile columns. The one or more decile columns may be a decile level representation of values of each of the selected continuous columns.

The one or more processors further extract sample data from the dataset based on the identified one or more parameters and recommend one or more rank ordered machine learning algorithms to one or more users, to generate one or more predictive models from the sample data. The recommendation may be based on characteristics of the dataset.

One or more heterogeneous predictive models are generated through the one or more processors based on the rank ordered algorithms through one or more iterations. Further, the generated one or more heterogeneous predictive models may be deployed automatically through the bulk data transferring tool, by dividing the dataset into smaller chunks based on the size of the dataset, predicting the outcome of the target column, and persisting the outcome in the distributed data warehouse.

In yet another aspect, a non-transitory computer-readable storage medium for heterogeneous predictive models generation based on sampling of big data is disclosed. The computer-readable storage medium stores computer-executable instructions to receive a dataset and a target column associated with the dataset at a data processing engine, from one or more distributed data warehouses located in multiple geographic regions. The one or more distributed data warehouses are communicatively coupled to the data processing engine through a high throughput distributed messaging system over a cluster computing network.

One or more columns associated with the dataset are classified at a data processing engine as a categorical column or a continuous column, based on at least one of a type of data or a distribution of data in the dataset. One or more parameters in the dataset are identified to extract a sample data from the dataset. The one or more parameters may be one or more of selected categorical columns, a target column or one or more decile columns. The one or more decile columns may be a decile level representation of values of each of the selected continuous columns.

The sample data from the dataset is extracted based on the identified one or more parameters. One or more rank ordered machine learning algorithms are recommended to one or more users, to generate one or more predictive models from the sample data. The recommendation may be based on characteristics of the dataset. One or more heterogeneous predictive models are generated based on the rank ordered algorithm through one or more iterations.

Further, the generated one or more heterogeneous predictive models are deployed automatically by dividing the dataset into smaller chunks based on the size of the dataset, predicting the outcome of the target column, and persisting the outcome in the distributed data warehouse, through a bulk data transferring tool.

The method, the system and/or the non-transitory computer-readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which:

FIG. 7 illustrates data profile and summary statistics of the selected dataset, according to one or more embodiments.

Other features of the present embodiments will be apparent from the accompanying drawings and from the detailed description that follows.

DETAILED DESCRIPTION

Example embodiments, as described below, may be used to provide a method, a system for automated development and deployment of predictive/machine learning model for larger datasets. Although the present embodiments have been described with reference to specific example embodiments, it will be evident that various modifications and changes may be made to these embodiments without departing from the broader spirit and scope of the various embodiments.

The present disclosure is a method and/or a system involving a mechanism to automate model development and deployment for larger datasets stored in the distribute data warehouse, by automating selection of sample data from the larger datasets, build domain agnostic machine learning/statistical models addressing both classification and regression problems and recommend a best fit model(s) for deployment.

In one or more embodiments, a method and/or a system for automated development and deployment of predictive/machine learning model for larger datasets (also referred as 'dataset') involves a unique combination of techniques such as a feature engineering and a data sampling which may extract an appropriate sample of larger dataset, maintaining distribution of important features/variables as in the larger (original) dataset.

In one or more embodiments, the system may comprise a knowledge engine to recommend a right algorithm with a scorecard against an input dataset and allows one or more users to make an informed choice. The system may also be configured to add one or more algorithms, program codes for development of predictive models. The predictive models thus developed, post selection by the one or more users and receiving one or more inputs, the system may automatically deploy the predictive models to predict outcome of a target variable in the dataset or the new dataset. As a whole, the system may build multiple machine learning models even for larger datasets with improved accuracy, efficiency and with very little or no human effort. Users may select any of the developed models to be deployed and the system may run prediction on the target dataset, providing the users a complete end to end automated experience for building and deploying machine learning model effortlessly.

Figure 1:
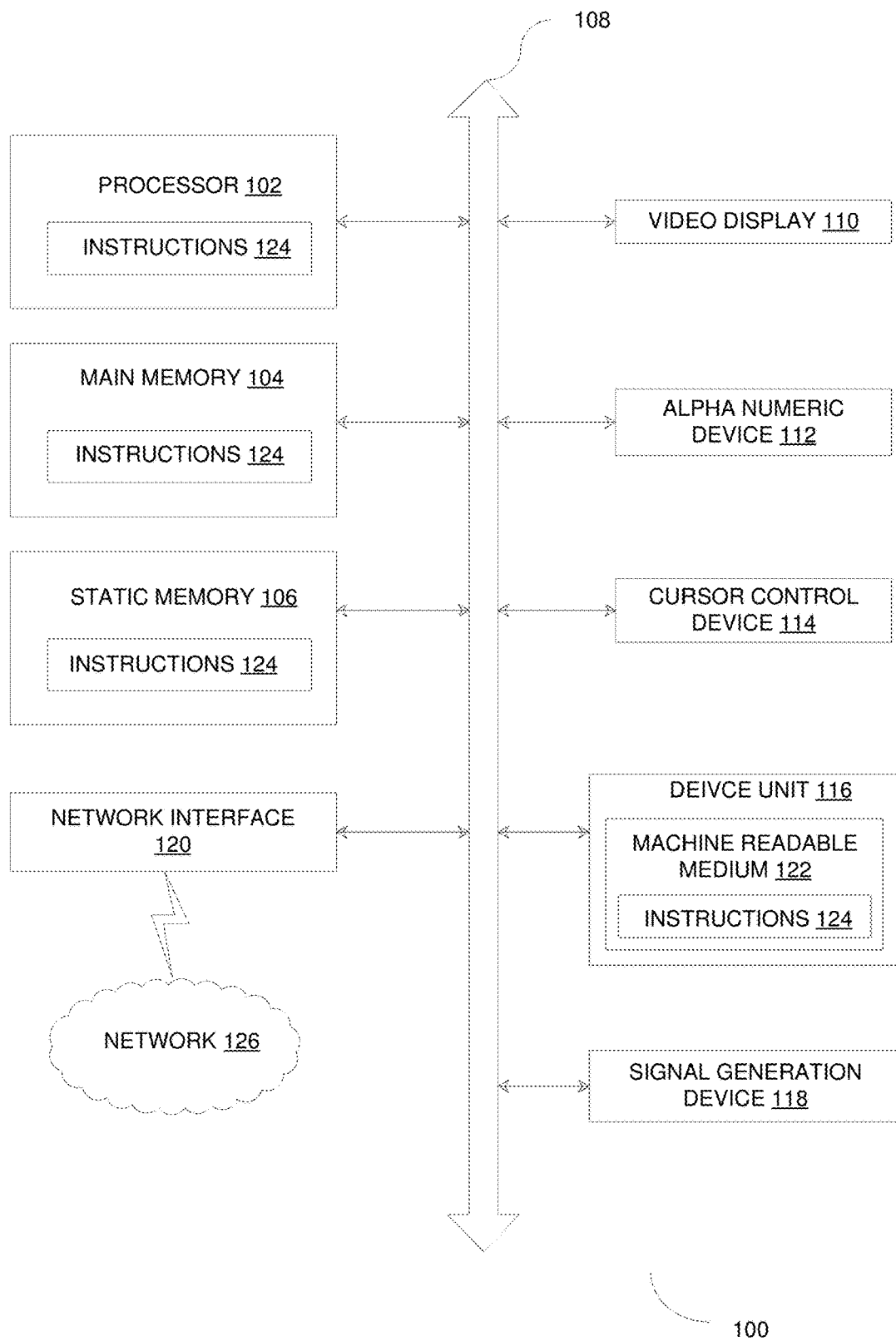
FIG. 1 is a diagrammatic representation of a data processing system capable of processing a set of instructions to perform any one or more of the methodologies herein, according to one or more embodiments.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Exemplary embodiments of the present disclosure provide a method and/or a system for automated development and deployment of predictive/machine learning model for larger datasets. The method may involve receiving a dataset and a target column associated with the dataset at a data processing engine, from one or more distributed data warehouses located in multiple geographic regions. The one or more distributed data warehouses may be communicatively coupled to the data processing engine through a high throughput distributed messaging system over a cluster computing network. One or more columns associated with the dataset may be classified at a data processing engine as a categorical column or a continuous column, based on at least one of a type of data or a distribution of data in the dataset. One or more parameters in the dataset may be identified to extract a sample data from the dataset. The one or more parameters may be at least one of selected one or more categorical columns, a target column or one or more decile columns or combination thereof. The one or more decile columns may be a decile level representation of values of each of the selected continuous columns.

The sample data from the dataset may be extracted based on the identified one or more parameters. One or more rank ordered machine learning algorithms may be recommended to one or more users, to generate one or more predictive models from the sample data. The recommendation may be based on characteristics of the dataset. One or more heterogeneous predictive models may be generated based on the rank ordered algorithm through one or more iterations.

The generated one or more heterogeneous predictive models may be deployed automatically by dividing the dataset into smaller chunks based on the size of the dataset, predicting the outcome of the target column, and persisting the outcome in the distributed data warehouse, through a bulk data transferring tool.

Figure 2:
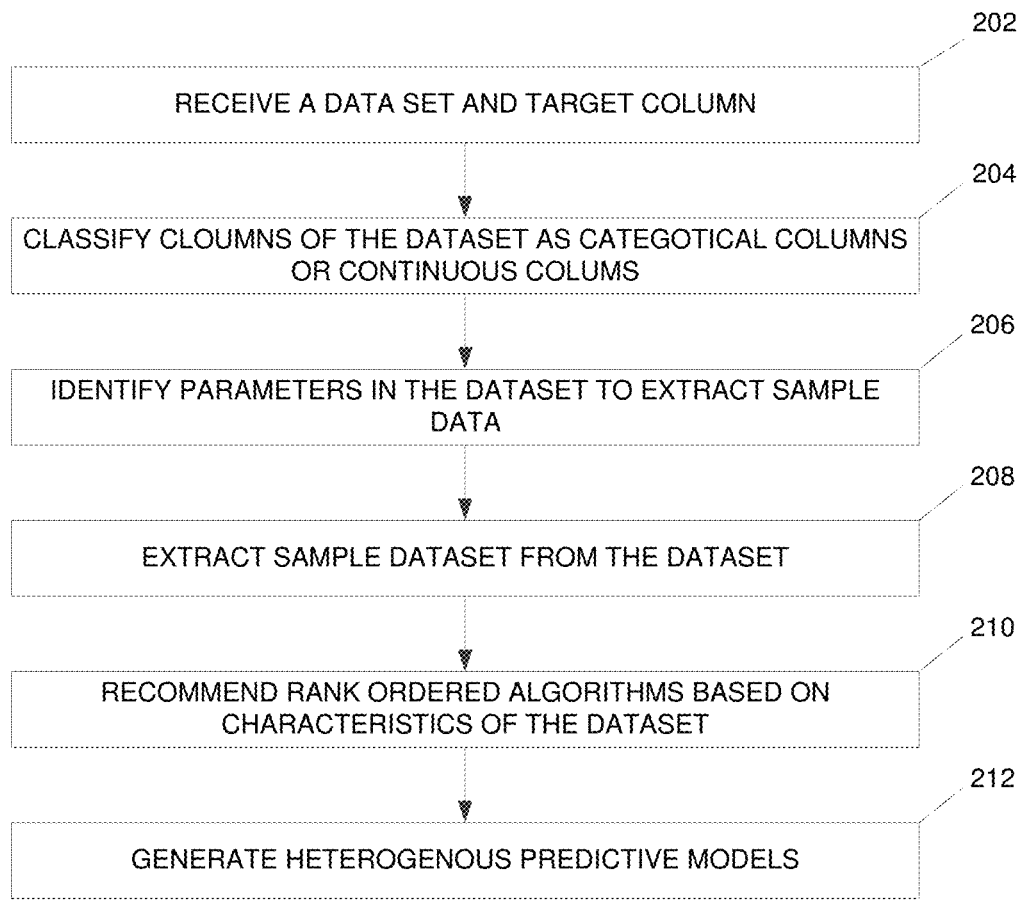
FIG. 2 is a process flow diagram illustrating automated development and deployment of predictive/machine learning model for larger datasets, according to one or more embodiments.

FIG. 2 is a process flow diagram illustrating automated development and deployment of predictive/machine learning model for larger datasets, according to one or more embodiments.

In one or more embodiments, a dataset and a target column associated with the dataset may be received from one or more distributed data warehouses located in multiple geographic regions, as in step 202. In one or more embodiments, receiving the dataset and the target column may be a user driven activity wherein user decides what needs to be fetched from the one or more distributed data warehouses. In one or more embodiments, receiving the dataset and the target column may be a system driven activity wherein the system may be configured to fetch the dataset and the target column. The dataset and the target column associated with the dataset may be received at a data processing engine. The dataset may constitute a larger dataset stored in the one or more distributed data warehouses.

In one or more embodiments, the target column may be split into multiple target columns and predictive models may be built for each of the multiple target columns. In one or more embodiments, the one or more distributed data warehouses may be communicatively coupled to the data processing engine through a high throughput distributed messaging system over a cluster computing network. The target column may be a target variable, for which the value needs to be predicted by building the predictive model for the larger dataset.

In one or more embodiments, the dataset may be visualized in the form of database tables. The dataset may contain one or more columns and one or more rows. The one or more columns may provide the structure according to which the one or more rows are composed. The one or more columns associated with the dataset may be classified as a categorical column and/or a continuous column as in step 204. The classification may be performed by the data processing engine, based on type of data or distribution of data in the dataset.

In one or more embodiments, a categorical columns may also be referred as a categorical variable. A continuous columns may also be referred as continuous variable. In statistics, the categorical variable may a variable that may take on one or a limited, usually fixed number of possible values. The categorical variable is also called as a nominal variable. For example, a state name that a resident of the United States lives in, blood type of a person and the like. The continuous variable may be a variable that may have infinite number of possible values.

One or more parameters may be identified in the dataset to extract a sample data from the dataset, as in step 206. The identification of the one or more parameters may be performed by an analytical engine. In one or more embodiments, the one or more parameters may be at least one of one or more categorical columns, a target column or one or more decile columns or combination thereof. In one or more embodiments, the one or more categorical columns may be at least one of the classified categorical column in the step 204.

In one or more embodiments, the data processing engine and the analytical engine may be a cluster centric systems, configured to operate with fault tolerance capabilities through a data structure. The data structure may be, but not limited to, a parquet, a text, a Comma Separated Values (CSV), and the like.

In one or more embodiments, the identification of the one or more parameters may comprise, selecting at least one continuous column associated with the target column. The association of the at least one continuous column with the target column may be determined through a first statistical test. The first statistical test may be at least one of, but not limited to a correlation analysis or a One-Way ANOVA (Analysis Of Variance) test. One or more categorical columns associated with the target column may be selected. The association of the one or more categorical columns with the target column may be determined though a second statistical test. The second statistical test may be at least one of, but not limited to a One-Way ANOVA test or a Chi-Squared test.

For example, the association may be determined as mentioned below.

If the target column/variable is continuous variable and if the variable/column of a dataset is continuous variable, a correlation analysis may be performed.

If the target column/variable is continuous variable and if the variable/column of a dataset is categorical variable, One-Way ANOVA test may be performed.

If the target column/variable is categorical variable and if the variable/column of a dataset is continuous variable, One-Way ANOVA test may be performed.

If the target column/variable is categorical variable and if the variable/column of a dataset is categorical variable, Chi-Squared test may be performed.

In one or more embodiments, one or more tests such as a Chi-Squared test, a One-Way ANOVA test and a correlation analysis may identify association of one or more columns (continuous or categorical) with a target column based on statistical tests.

The Chi-Squared test is a statistical measure to identify 'goodness of fit', typically used to analyze a categorized data. For example, one can determine which all categorical variables distributions are contributing to variance in the target column/variable.

The One-Way ANOVA test, also called 'one-way analysis of variance'. Since Chi-Squared test cannot be used for continuous variables, the One-Way ANOVA test may be used to identify important one or more continuous variables. One can determine which all continuous variables distributions are contributing to variance in the target column/variable. The Correlation Analysis is typically used to measure a strength of relationship between one or more variables.

One or more decile levels for the selected at least one continuous columns may be determined and the one or more decile levels may be persisted as one or more decile columns in the dataset. The one or more categorical columns, one or more decile columns and the target column may be selected as the one or more parameters. The one or more parameters may be at least one of one or more categorical columns, one or more decile columns or the target column or combination thereof. The one or more decile columns may be decile level representation of value of each of the selected continuous columns.

In one or more embodiments, the one or more parameters are independent of each other. The independence of the one or more parameters may be determined through a third statistical test. The third statistical test may be, but not limited to a Chi-Squared test.

In one or more embodiments, the sample data may be extracted from the dataset based on the identified one or more parameters, as in step 208. The one or more rank ordered algorithms may be recommended to one or more users, as in step 210. The recommendation may be based on the characteristics of the dataset. The characteristics of the dataset may be, but not limited to size of the dataset, number of categorical variable or continuous variables, type of machine learning problem, a target column and the like. The one or more rank ordered algorithms may be, but not limited to, a Random Forest algorithm, an Extreme Gradient Boosting algorithm, a Generalized Linear Model algorithm, a Support Vector Machines algorithm, a Stochastic Gradient Boosting algorithm and the like. One or more heterogeneous predictive models may be generated based on the rank ordered algorithm through one or more iterations, as in step 212.

In one or more embodiments, the one or more generated heterogeneous predictive models for the dataset may be deployed by dividing the dataset into smaller equal chunks based on the size of the dataset, predicting the outcome of the target column and persisting the outcome in the distributed data warehouse through a bulk data transferring tool.

In one or more embodiments, diving the dataset into smaller chunks may comprise associating row numbers to the dataset, and splitting the dataset into smaller chunks based on the row numbers.

Figure 3:
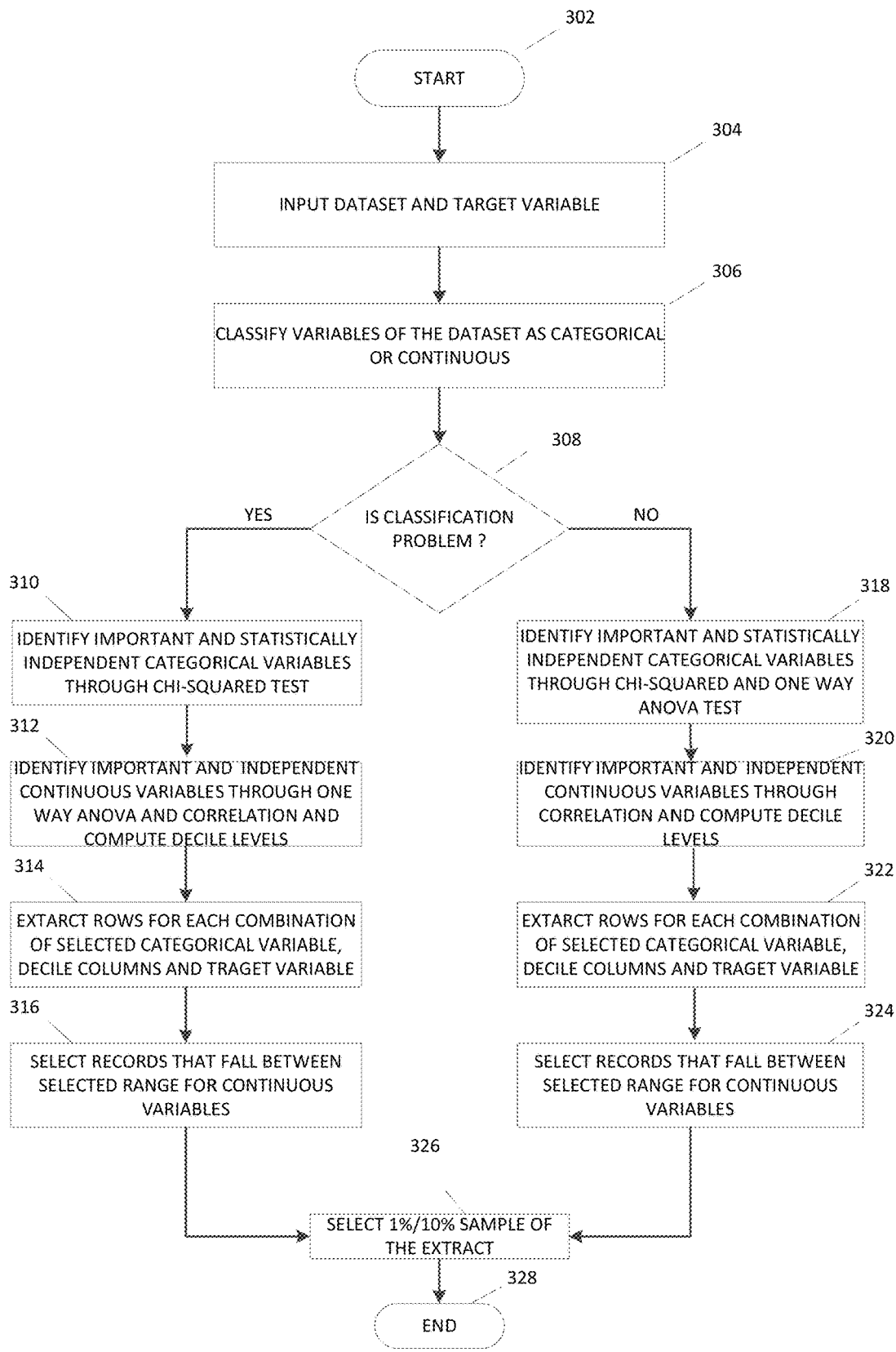
FIG. 3 is a flowchart illustrating steps performed for data sampling, according to one or more embodiments.

FIG. 3 is a flowchart illustrating steps performed for data sampling, according to one or more embodiments. FIG. 3 depicts a method of sampling to fetch sample data from a larger dataset. By the method of sampling, one or more parameters to fetch a sample data from a larger dataset may be identified. Based on the one or more parameters, the sample data, which is represents the larger dataset in better way is extracted for predictive model development.

In one or more embodiments, the process of sampling may be started (302) by receiving a dataset and a target variable, as in step 304. The received dataset may contain data with one or more variables. In one or more embodiments, the one or more variables may also be referred as one or more columns. The one or more variables may be classified as a categorical variable and/or a continuous variable, as in step 306.

In one or more embodiments, the category under which a problem falls may be identified, as in step 308. The problem may be a business problem. The problem may be categorized as classification problem if the target variable whose values need to be predicted, is categorical variable. The problem may be categorized as regression problem if the target variable whose values need to be predicted, is continuous variable. In one or more embodiments, one or more target variables may be considered through iterations.

In one or more embodiments, if the problem is a classification problem, important and statistically independent one or more categorical variables may be identified, as in step 310. The identification of the importance and the statistically independence of the one or more categorical variables may be identified through a Chi-Squared test. An important and statistically independent one or more continuous variables may be identified, as in step 312. The identification of the importance and the statistically independence of the one or more continuous variables may be identified through at least one of, but not limited to a One-Way ANOVA test or a correlation analysis. One or more decile levels may be determined for the one or more continuous variables. The one or more decile levels may be persisted as one or more decile columns in the dataset. The one or more decile levels may be determined based on methodologies known in the art.

In one or more embodiments, one or more of categorical or continuous variables may be considered as important if the one or more of categorical or continuous variables describe a variance in a target column/variable that needs to be predicted.

In one or more embodiments, the statistically independence may depict that the one or more of categorical or continues variables are not dependent on any other variable except a target column/variable. The one or more categorical or continuous columns may be independent of each other.

In one or more embodiments, one or more rows in the dataset may be extracted based on at least one of the one or more of important and statistically independent categorical columns or continuous columns, one or more decile columns and the target variable, or combination thereof, as in step 316. One or more values of the one or more rows, where the one or more values fall in the range of mean±(2*Standard Deviation) may be extracted for the selected one or more continuous variables, as in step 316. The mean and the Standard Deviation may be values determined for data/values of one or more continuous variables chosen as important for data sampling. Further, $$\frac{1\%}{10\%}$$

or the extracted values may be selected as a sample data, as in step 326. The extraction of values may not be limited to $$\frac{1\%}{10\%}.$$

In one or more embodiments, one or more values to be extracted, may be determined/configured by the user or may be determined by the system on run-time based on size of input dataset.

In one or more embodiments, if the problem is a regression problem, important and statistically independent one or more categorical variables may be identified, as in step 318. The identification of the importance and the statistically independence of the one or more categorical variables may be identified through a statistical dependence test, but not limited to a Chi-Squared test or One-Way ANOVA test. An important and statistically independent one or more continuous variables may be identified, as in step 320. The identification of the importance and the statistically independence of the one or more continuous variables may be identified through but not limited to correlation. In one or more embodiments, one or more categorical or continuous variables may be considered as important if the one or more categorical or continuous variables describe a variance in a target column/variable.

One or more decile levels may be determined for the one or more continuous variables. The one or more decile levels may be persisted as one or more decile columns in the dataset.

In one or more embodiments, one or more rows in the dataset may be extracted based on at least one of the one or more selected categorical columns or continuous columns, one or more decile columns and the target variable or combination thereof, as in step 322. One or more values of the one or more rows, where the one or more values fall in the range of mean±(2*Standard Deviation) may be extracted for the selected one or more continuous variables, as in step 324. The mean and the Standard Deviation may be values determined for data/values of one or more continuous variables chosen as important for sampling. Further, $$\frac{1\%}{10\%}$$

of the extracted values may be selected as a sample data, as in step 326. Once the sample data is selection, the sampling step may said to be completed (328).

Figure 4:
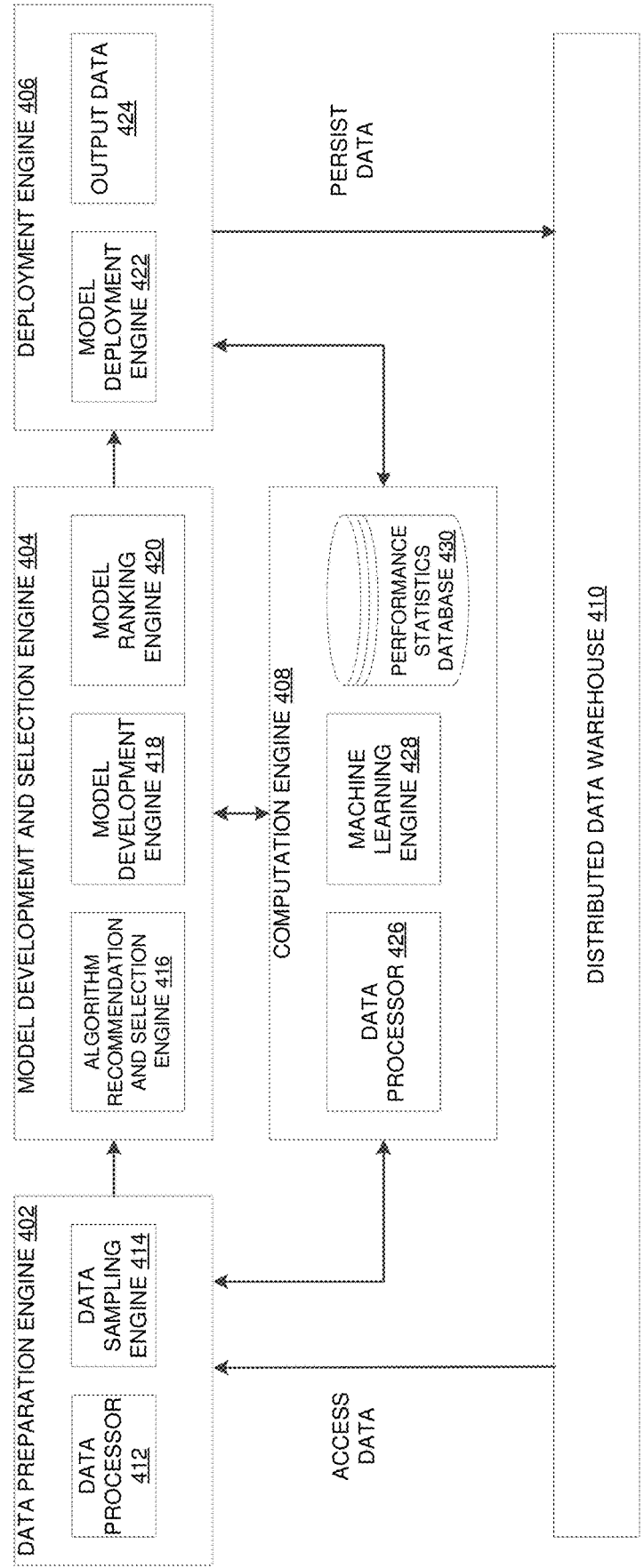
FIG. 4 is a block diagram illustrating the system for automated development and deployment of predictive/machine learning model for larger datasets, according to one or more embodiments.

FIG. 4 is a block diagram, illustrating the system for automated development and deployment of predictive models for larger datasets, according to one or more embodiments. In one or more embodiments, the system comprises a data preparation engine 402, a model development and selection engine 404, and a deployment engine 406, a computation engine 408 and a distributed data warehouse 410.

In one or more embodiments, the data preparation engine 402 may comprise a data processor 412 and a data sampling engine 414. The model development and selection engine 404 may comprise an algorithm recommendation and selection engine 416, a model development engine 418, and a model ranking engine 420. The deployment engine 406 may comprise a model deployment engine 422 and an output data 424. The computation engine 408 may comprise a data processor 426, a machine learning engine 428 and a performance statistics database 430.

The distributed data warehouse may be 410 may be communicatively coupled to data preparation engine 402 and the deployment engine 416 over a cluster computing network. The distributed data warehouse 410 may be located in multiple geographies. The computation engine 408 may be communicatively coupled to the data processing engine 402, the model development and selection engine 404 and the deployment engine 406 over the cluster computing network. The data preparation engine 402 may be communicatively coupled to the model development and selection engine 404. The model development and selection engine 404 is further associated with the deployment engine 406 over the cluster computing network.

In one or more embodiments, the data preparation engine 402 may be configured to receive data from the distributed data warehouse 410. The accessed data may comprise a dataset and a target variable. The dataset may be part of larger dataset stored in the distributed data warehouse. The data processor 412 may be configured to classify the dataset into one or more categorical or continuous variables, based on one or more of, but not limited to type of data or a distribution of data in the dataset. The data sampling engine 414 may be configured to extract a sample data from the dataset. The process of sampling is described in previous paragraphs. The data sampling engine 402 may be configured to extract a sample data from the dataset, as described in FIG. 3. The data preparation engine 402 may be further configured to send the extracted sample data to the model development and selection engine 404.

The algorithm recommendation and selection engine 416 may be configured to store one or more rank ordered algorithms in a database associated with the algorithm recommendation and selection engine 416. The algorithm recommendation and selection engine 416 may be further configured to recommend one or more rank ordered algorithms to one or more users. The one or more rank ordered algorithms may be shortlisted based on historical model development metadata and performance statistics stored in the performance statistics database 430. At least one of the one or more rank ordered algorithms may be selected by a user. The model development engine 418 may be configured to develop one or more predictive models based on the one or more rank ordered algorithms through one or more iterations. In one of the embodiments, a predictive model may be generated based on the selected at least one rank ordered algorithm by the user, from the one or more rank ordered algorithms recommended by the algorithm recommendation and selection engine 416. The model ranking engine 420 may be configured to rank the one or more algorithms stored in the algorithm recommendation and selection engine 416. In one or more embodiments, the one or more algorithms may be stored in the machine learning engine 428. The one or more algorithms may be fetched by the algorithm recommendation and selection engine 416 from the machine learning engine 428 over the cluster computing network.

In one or more embodiments, the model deployment engine 422 may be configured to receive the predictive/machine learning model and a target dataset. The target dataset may be a dataset on which the predictive model needs to be applied. In one of the embodiments, the target dataset may be the dataset received by the data preparation engine 402. In another embodiment, the target dataset may be another dataset received by the data preparation engine 402, from the distributed data warehouse 410. The model deployment engine may be further configured to deploy the predictive model that is built by the model development and selection engine 404. The model deployment engine 422 may be further configured to automatically split the dataset into smaller chunks and predict the outcome of the target variable. The outcome of the prediction may be the output data 424. The output data 424 may be persisted into the distributed data warehouse 410 over a cluster computing network. The data processor 426 may configured to preform execution of one or more instructions.

In one or more embodiments, the machine learning engine 428 may be configured to store one or more algorithms used for building one or more predictive models. The machine learning engine 428 may further generate the historical model development metadata and the performance statistics for the one or more rank ordered algorithms, and are stored in the performance statistics database 430.

Figure 4A:
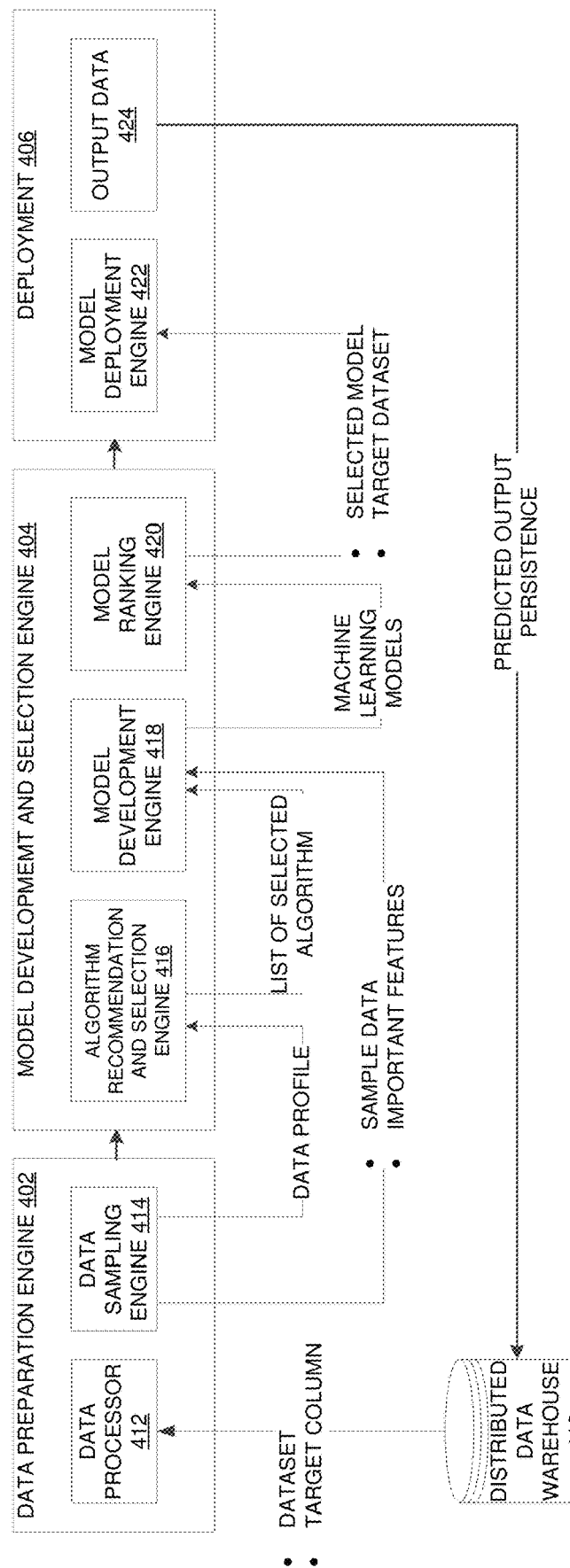
FIG. 4A is a flow diagram illustrating the flow of data between the different components of the system for automated development and deployment of predictive/machine learning model for larger datasets, according to one or more embodiments.

FIG. 4A illustrates the flow of data between the different components of the system for automated development and deployment of predictive/machine learning model for larger datasets, according to one or more embodiments. In one or more embodiments, the data processor 412 may receive a dataset and a target column associated with the dataset from the distributed data warehouse 410. The data sampling engine 414 may send a sample data and one or more important features/columns to the model development engine 418. The data sampling engine 414 may further send data profile to the algorithm recommendation and selection engine 416. The algorithm recommendation and selection engine 416 may send the list of algorithms selected by one or more users, among the one or more rank ordered algorithms recommended by the algorithm recommendation and selection engine 416.

Data profile may provide details of columns such as number of columns and type of columns, how many distinct values, min-max, and distribution type such as normal and exponential. The data profile is described in FIG. 7.

The model development engine 418 may send one or more machine learning models or predictive models that are built by model development engine 418 to the model ranking engine 420. The model ranking engine 420 may send developed predictive model and a target dataset to the model deployment engine 422. Post model deployment and prediction of the values of the target column (also referred as target variable), which is considered as the output data 424, may be persisted in the distributed data warehouse 410.

Figure 5:
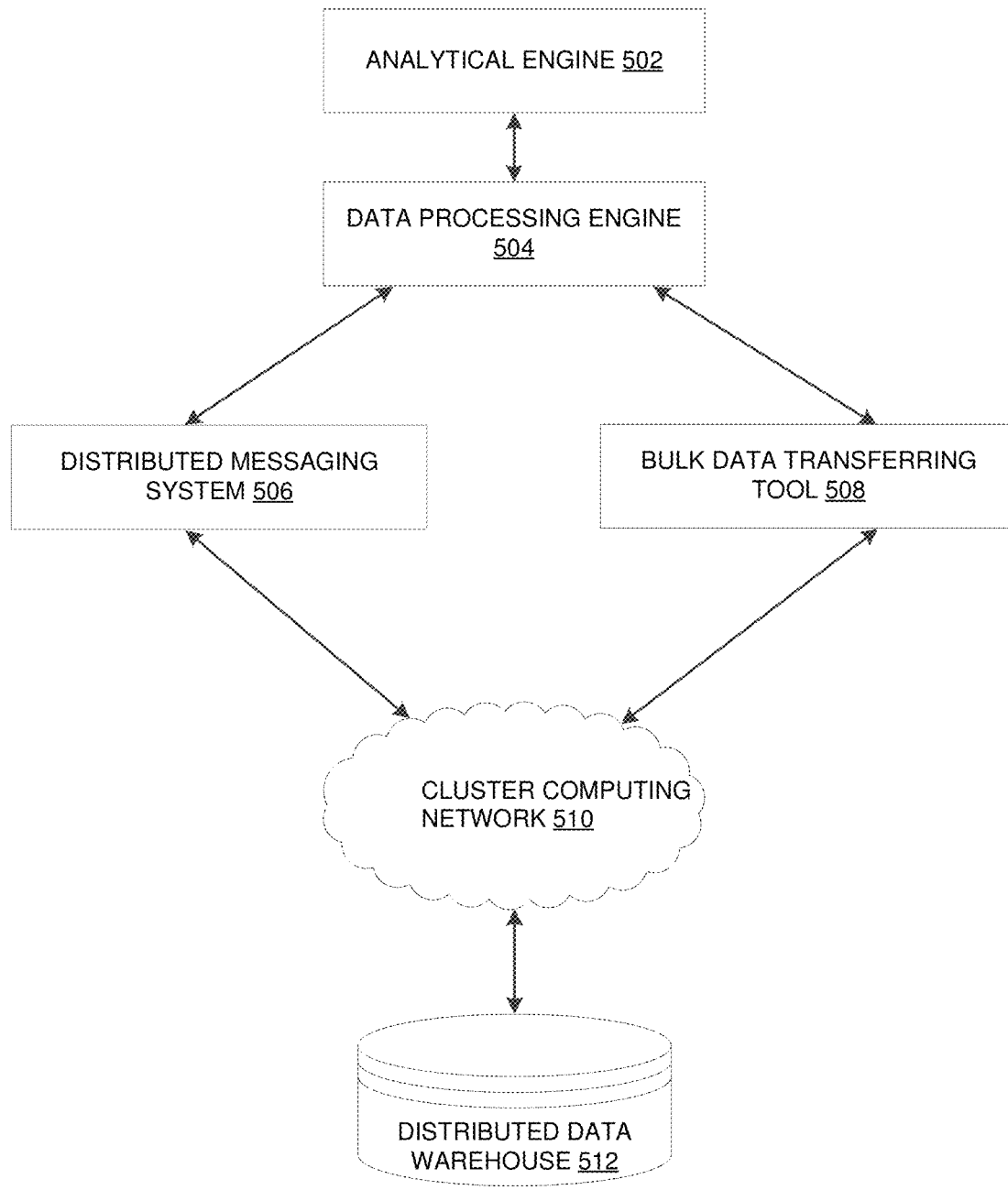
FIG. 5 is an architecture diagram illustrating different component of the system for automated development and deployment of predictive/machine learning model for larger datasets, communicatively coupled to each other over a cluster computing network, according to one or more embodiments.

FIG. 5 is an architecture diagram, illustrating different component of a system for automated development and deployment of predictive/machine learning model for larger datasets communicatively coupled to each other over a cluster computing network 510, according to one or more embodiments. In one or more embodiments, the system may comprise an analytical engine 502, a data processing engine 504, a high throughput distributed messaging system 506, a bulk data transferring tool 508, a cluster computing network 510 with one or more communicatively coupled nodes and a distributed data warehouse 512. The system further comprises one or more processors and one or more memory units communicatively coupled to the one or more processors over the cluster computing network. The data processing engine 504 and the analytical engine 502 may be a cluster centric systems, configured to operate with fault tolerance capabilities through a data structure. The data structure may be, but not limited to a parquet, a text, a Comma Separated Values (CSV) and the like.

In one or more embodiments, the data processing engine 504 may receive, a dataset and a target column associated with the dataset may be received from the distributed data warehouse located in multiple geographic regions. The dataset may constitute a larger dataset stored in the one or more distributed data warehouses. In one or more embodiments, the one or more distributed data warehouses may be communicatively coupled to the data processing engine 504 through a high throughput distributed messaging system 506 over a cluster computing network 510. The target column may be a target variable, for which one or more values need to be predicted by building the predictive model for larger datasets.

In one or more embodiments, the dataset may be visualized in the form of database tables. The dataset may contain one or more columns and one or more rows. The one or more columns may provide the structure according to which the one or more rows are composed. The data processing engine 504 may classify the one or more columns associated with the dataset as a categorical column and/or continuous column. The classification may be based on type of data or distribution of data in the dataset.

The analytical engine 502 may identify one or more parameters to extract a sample data in the dataset. In one or more embodiments, the one or more parameters may be at least one of one or more categorical columns, a target column and one or more decile columns or combination thereof. The one or more categorical columns may be at least one of the classified categorical column.

In one or more embodiments, the identification of the one or more parameters may comprise, selecting at least one continuous column associated with the target column. The association of the at least one continuous column with the target column may be determined through at least one of a correlation analysis or a One-Way ANOVA test. One or more categorical columns associated with the target column may be selected. The association of the one or more categorical columns with the target column may be determined though at least one of One-Way ANOVA test or Chi-Squared test.

For example, the association may be determined as mentioned below.

If the target column/variable is continuous variable and if the variable/column of a dataset is continuous variable, a correlation analysis may be performed.

If the target column/variable is continuous variable and if the variable/column of a dataset is categorical variable, One-Way ANOVA test may be performed.

If the target column/variable is categorical variable and if the variable/column of a dataset is continuous variable, One-Way ANOVA test may be performed.

If the target column/variable is categorical variable and if the variable/column of a dataset is categorical variable, Chi-Squared test may be performed.

One or more decile levels for the selected continuous column(s) may be determined and the one or more decile levels may be persisted as one or more decile columns in the dataset. The one or more categorical columns, one or more decile columns and the target column may be selected as the one or more parameters. The one or more parameters may be at least one of one or more categorical columns, one or more decile columns and the target column or combination thereof. The one or more decile columns may be decile level representation of value of each of the selected continuous columns.

The one or more processors may extract the sample data from the dataset based on the identified one or more parameters. The one or more processors may recommend one or more rank ordered algorithm to one or more users. The recommendation may be based on the characteristics of the dataset. The one or more processors may generate one or more heterogeneous predictive models based on the rank ordered algorithm through one or more iterations.

The one or more processors may further deploy one or more generated heterogeneous predictive models by dividing the dataset into smaller chunks based on the size of the dataset, predicting the outcome of the target column and persisting the outcome in the distributed data warehouse through a bulk data transferring tool 508.

In one or more embodiments, a method and/or a system for automated development and deployment of predictive/machine learning model for larger datasets, is disclosed. The system may comprise one or more processors configured to perform a data sampling, a model development and a model deployment, automatically.

In one or more embodiments, a data sampling may be performed to extract a right representative sample from large datasets for building machine learning models. The data sampling may be focused on solving data sampling challenges to address machine learning problems such as classification problem and regression problem at a big data scale, at the same time being resource efficient and cost effective.

A dataset and a target variable from a distributed data warehouse communicatively coupled to the system over a cluster computing network. The target variable may also be referred as outcome variable. One or more variables associated with the dataset may be classified as categorical variables and/or continuous variables. The classification may be performed based on the type of the one or more variables and/or distribution of the one or more variables in the dataset. A type of machine learning problem may be identified as either classification problem or regression problem based on the type if the target variable. The target variable may be either a categorical variable or a continuous variable.

For classification problems, one or more important and statistically independent categorical variables may be identified from the classified one or more categorical variables, by performing a Chi-Squared test. One or more important and statistically independent continuous variables may be identified from the classified one or more continuous variables by performing at least one of a One-Way ANOVA test or a correlation. One or more decile levels may be computed for the one or more continuous variables and may be added as one or more new decile columns in the dataset.

For regression problems, one or more important and statistically independent categorical variables may be identified from the classified one or more categorical variables, by performing at least one of a Chi-Squared test or a One-Way ANOVA test. One or more important and statistically independent continuous variables may be identified from the classified one or more continuous variables by performing a correlation. One or more decile levels may be computed for the one or more continuous variable and may be added as one or more new decile columns in the dataset.

One or more rows in the dataset may be extracted may be extracted for at least one of one or more selected categorical variables (also referred as categorical columns), one or more decile columns and a target variable where the values of the one or more rows fall in a range of mean±(2*Standard Deviation) for the selected continuous one or more continuous variables. The mean and the Standard Deviation may be values determined for data/values of one or more continuous variables chosen as important for $$\frac{1\%}{10\%}$$

sampling. In both the cases of regression problem and classification problem, of the above extraction may be considered as a sample data. The method of sampling extracts a fairly small representation of the larger dataset and yet builds a robust statistical models.

In one or more embodiments, the sample data extracted through the method of data sampling may be used to build a predictive model based on one or more algorithms suggested by the system. The one or more algorithms suggested by the system may be shortlisted based on historical model development metadata and performance statistics stored in the system. A probabilistic model may be used to suggest most probable algorithm based on characteristics of the input dataset. The characteristics of the input dataset may be, but not limited to size of the dataset, number of categorical variable or continuous variables, type of machine learning problem, a target column and the like. One or more users may be allowed to add new algorithms to the existing set of one or more algorithms. The system may also be configured to store and maintain the metadata and the performance statistics for each iteration making it more robust over time.

In one or more embodiments, the system may allow one or more users to plugin custom code for feature engineering to further enrich the input data.

In one or more embodiments, a feature engineering may be a process in data analytics, which may be used to derive additional information of one or more variables, conversion of categorical and continuous variables, derivation of new variables and transformation of existing variables into other variables.

The system may also allow one or more users to plugin model formula for model development. If no formula is provided, the system may derive a best formula based on importance of feature in describing the target or outcome variable. In one or more embodiments, a feature may be an attribute in the dataset, for example a column in the dataset. The system may further prepare model performance score on one or more metrics such as, but not limited to an accuracy, a kappa statistic, an R-Squared, a Root Mean Squared Error (RMSE). The system may also compare performance parameters of new model developed with existing deployed model parameters. The system may also suggest top performing model for deployment. The system may allow one or more users to iterate one or more steps of model development by modifying at least one of parameters such as model formula, training control parameters or addition of new algorithms.

In one or more embodiments, the system may allow one or more users to deploy a model, selected at the model development stage, for larger datasets over a distributed computing environment. The system may automatically split a new dataset or an existing dataset into smaller chunks to predict outcome of a target variable and persist the output into the distributed data warehouse. The system may further provide one or more users, a dashboard report, which may display performance of one or more algorithms and/one or more heterogeneous predictive models on different type of datasets, on a user interface associated with the system. Based on model ranking on the dashboard, and other relevant reports, users may decide to perform another iteration if model development for all selected one or more algorithms, with necessary improvements and/or customizations such as, but not limited to change in formula for model generation.

The one or more users may see results and model rankings for each iteration and may make informed decision in the deployment or re-deployment of the one or more predictive models. The system may efficiently run target data prediction for selected target column.

Figure 6:
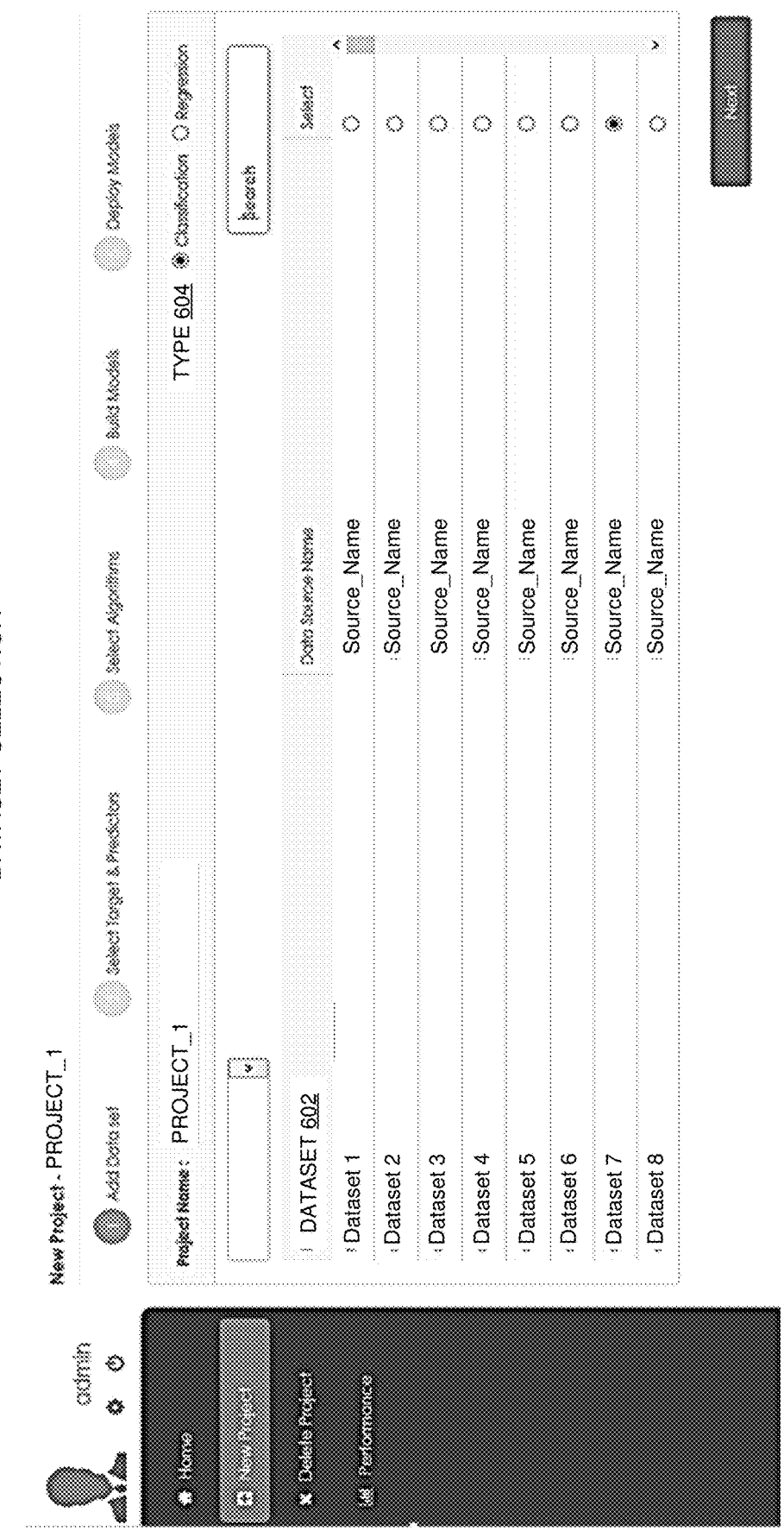
FIG. 6 is illustrates dataset selection to build predictive models, according to one or more embodiments.

FIG. 6 is illustrates dataset selection to build predictive models, according to one or more embodiments. In one or more embodiments, one or more datasets 602 may be listed on the user interface associated with a system to build and deploy predictive models. The screenshot may also depict the type of problem 604, allowing user to decide the type as regression or classification problem. In another embodiments, the system may automatically decide the type of problem based on the type of target variable.

Figure 7:
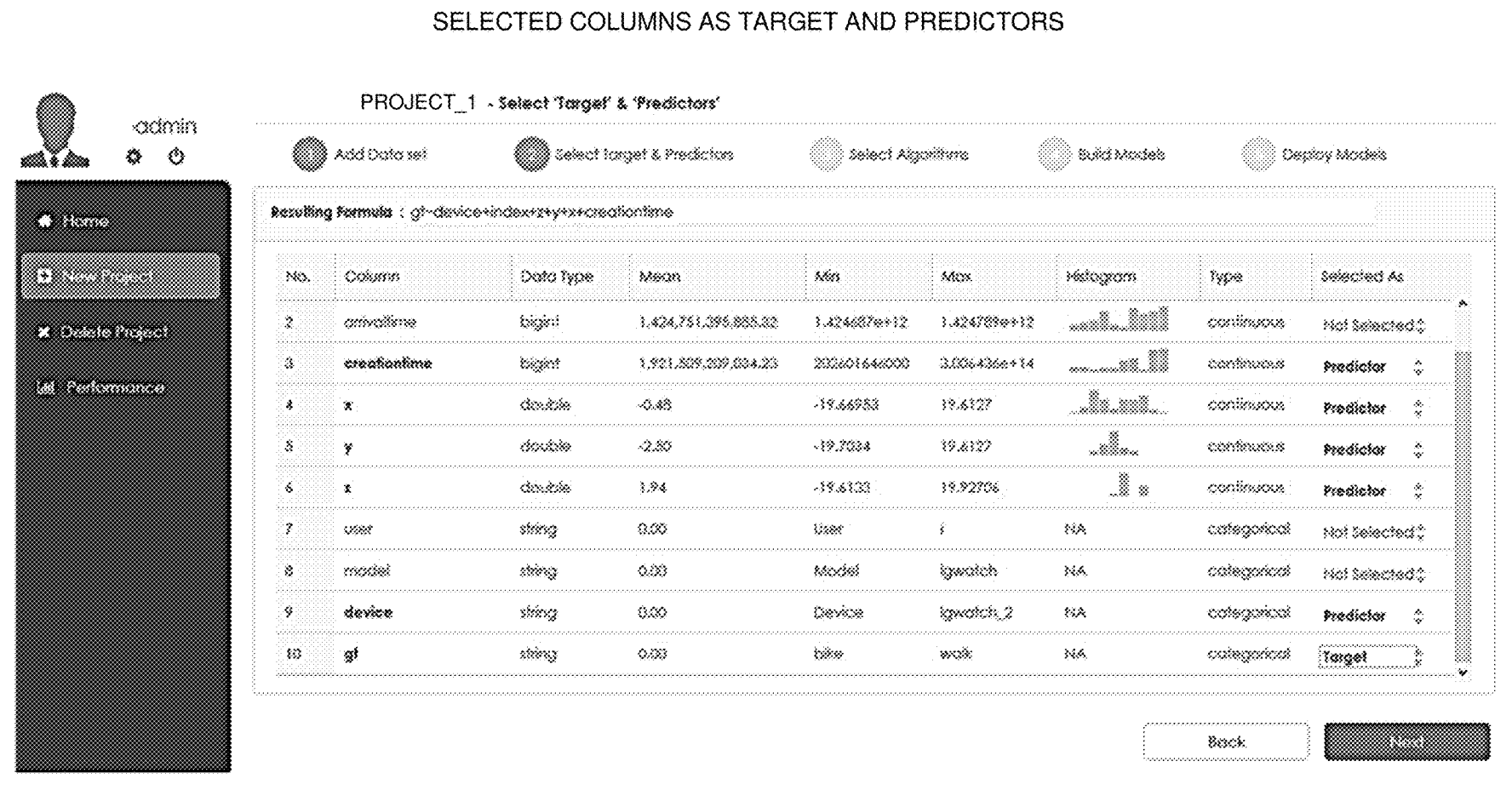

FIG. 7 illustrates data profile and summary statistics of the selected dataset according to one or more embodiments. The data profile may comprise information of the data/values present in the selected dataset, but not limited to a column (column name), a data type, a mean (a mean value of all the values present in a column), a min (a minimum value of values present in a column), a max (a maximum value of all the values present in a column), a type of a column and the like.

In one or more embodiments, a user may select one or more columns (also referred as variables) as the target variable and/or the predictor. In another embodiment, a processor may be configured to perform the selection of the one or more columns as the target variable and/or a predictor, automatically, as configured by one or more users. The one more user may also override the selection of variables performed by the processor. The predictor may be one or more variables based on which the target variable is predicted. The predictor may be one or more important and statistically independent variables.

Figure 8:
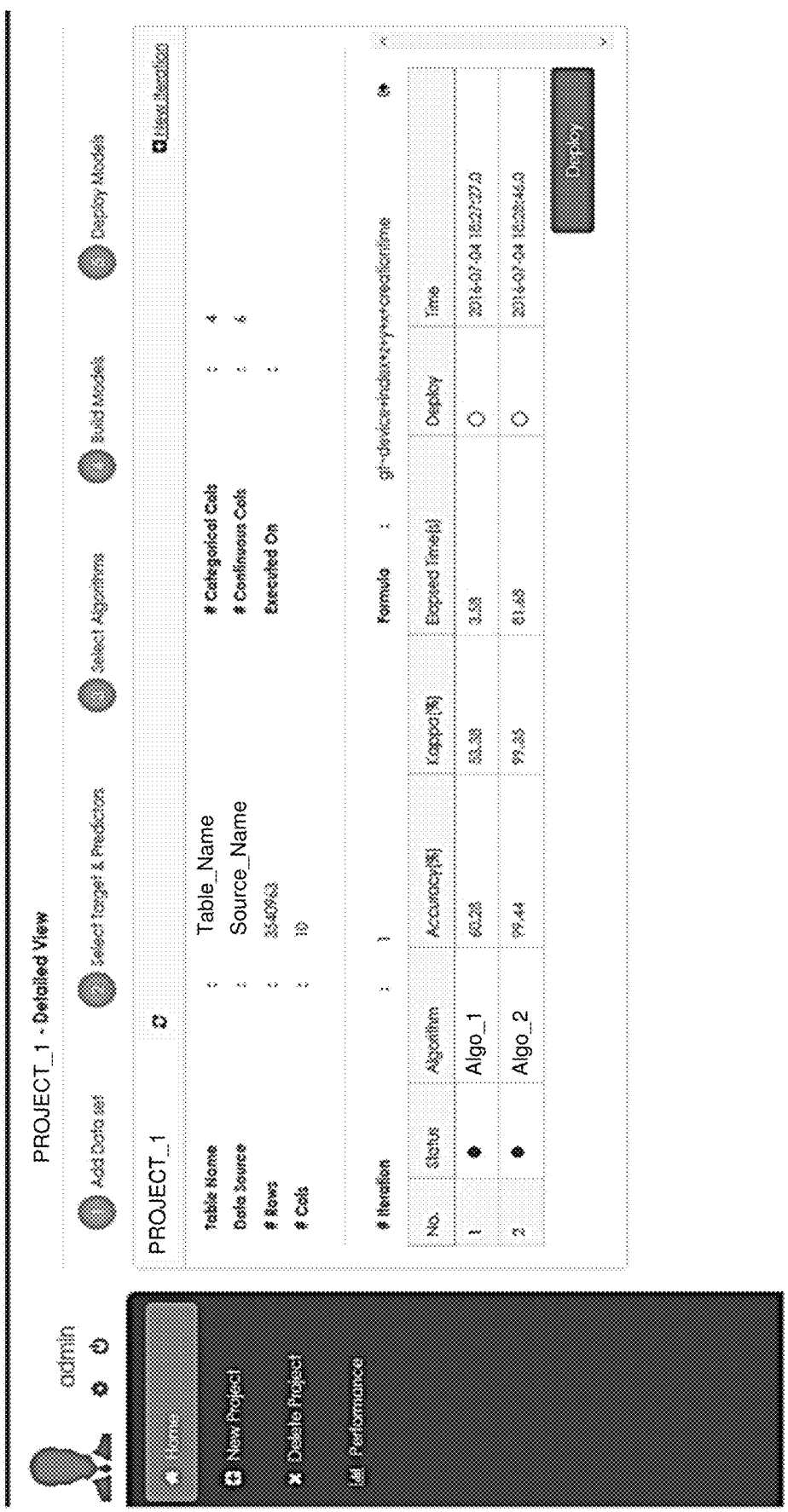
FIG. 8 illustrates a detailed view, post development of one or more predictive models based on one or more algorithms, according to one or more embodiments.

FIG. 8 illustrates a detailed view, post development of one or more predictive models based on one or more algorithms, according to one or more embodiments. In one or more embodiments, a user may select at least one of one or more developed models for deployment.

In one or more embodiments, a non-transitory computer-readable storage medium for heterogeneous predictive models generation based on sampling of big data is disclosed. The computer-readable storage medium stores computer-executable instructions to receive a dataset and a target column associated with the dataset at a data processing engine, from one or more distributed data warehouses located in multiple geographic regions. The one or more distributed data warehouses may be communicatively coupled to the data processing engine through a high throughput distributed messaging system over a cluster computing network.

One or more columns associated with the dataset may be classified at a data processing engine as a categorical column or a continuous column, based on at least one of a type of data or a distribution of data in the dataset. One or more parameters in the dataset may be identified to extract a sample data from the dataset. The one or more parameters may be at least one of selected one or more categorical columns, a target column and one or more decile columns or combination thereof. The one or more decile columns may be a decile level representation of values of each of the selected continuous columns.

The sample data from the dataset is extracted based on the identified one or more parameters. One or more rank ordered machine learning algorithms may be recommended to one or more users, to generate one or more predictive models from the sample data. The recommendation may be based on characteristics of the dataset. One or more heterogeneous predictive models are generated based on the rank ordered algorithm through one or more iterations.

Further, the generated one or more heterogeneous predictive models may be deployed by dividing the dataset into smaller chunks based on the size of the dataset, predicting the outcome of the target column, and persisting the outcome in the distributed data warehouse, through a bulk data transferring tool Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine-accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A computer-implemented method for heterogeneous predictive models generation based on sampling of big data, the method comprising:
   receiving, at a data processing engine, a dataset comprising a plurality of columns comprising a target column associated with the dataset, from one or more distributed data warehouses;
   classifying, at a data processing engine, one or more columns associated with the dataset as a categorical column or a continuous column, based on a type of data or a distribution of data in the dataset;
   identifying, at an analytical engine, one or more columns in the dataset as statistically independent columns, wherein the one or more statistically independent columns is comprise one or more categorical columns and one or more continuous columns;
   for at least one of the continuous columns identified as statistically independent, calculating a mean and a standard deviation;
   extracting, through a processor, extracted rows from the dataset, based on the mean and the standard deviation of the at least one of the continuous columns identified as statistically independent;
   selecting a percentage of the extracted rows as a sample dataset representing the dataset;
   recommending, through a processor, one or more rank ordered machine learning algorithms to one or more users, wherein the recommendation is based on characteristics of the dataset; and
   generating, through a processor, from the sample dataset, one or more heterogeneous predictive models, based on the rank ordered machine learning algorithms through one or more iterations.

2. The method of claim 1, further comprising deploying, the generated one or more heterogeneous predictive models for the dataset, wherein the deployment comprises:
   dividing the dataset into smaller chunks based on the size of the dataset;
   predicting an outcome of the target column; and
   persisting the outcome in the distributed data warehouse, through a bulk data transferring tool.

3. The method of claim 1, wherein the dataset constitutes a larger dataset stored in the distributed data warehouse.

4. The method of claim 1, wherein the distributed data warehouse is communicatively coupled to the data processing engine through a high throughput distributed messaging system over a cluster computing network.

5. The method of claim 1, wherein the identification of the one or more statistically independent columns comprises:
   selecting, at least one continuous column associated with the target column, wherein the association is determined through a first statistical test;
   selecting, one or more categorical columns associated with the target column, wherein association is determined through a second statistical test;
   determining, one or more decile levels for the selected at least one continuous column and persisting one or more decile columns as new columns in the dataset; and
   selecting, at least one of one or more categorical columns, one or more decile columns or a target column as the one or more statistically independent columns.

6. The method of claim 5, wherein the one or more decile columns are a decile level representation of values of each of the selected continuous columns.

7. The method of claim 5, wherein:
   the one or more statistically independent columns are independent of each other; and
   the independence of the one or more statistically independent columns are determined through a third statistical test.

8. An heterogeneous predictive models generator, comprising:
   a cluster computing network with one or more communicatively coupled nodes;
   a high throughput distributed messaging system;
   one or more distributed data warehouses;
   a bulk data transferring tool;
   a data processing engine;
   an analytical engine;
   at least one processor; and
   at least one memory unit communicatively coupled to at least one processor over the cluster computer network and having instructions stored thereon that, when executed by the at least one processor, cause the at least one processor to:
   receive, at a data processing engine, a plurality of columns comprising columns associated with a dataset and a target column associated with the dataset, from the one or more distributed data warehouses;
   classify, at a data processing engine, the columns associated with the dataset as categorical columns or continuous columns, based on a type of data or a distribution of data in the dataset;
   identify, at an analytical engine, one or more of the columns associated with the dataset as statistically independent columns, wherein the one or more statistically independent columns comprise one or more categorical columns and one or more continuous columns;
   extract, through a processor, sample data from the dataset, based on the identified one or more statistically independent columns;
   display, through a processor on a user interface, one or more rank ordered machine learning algorithms to one or more users as a recommendation, wherein the recommendation is based on characteristics of the dataset, and the user interface comprises a user interface feature operable to select a column in the dataset as a predictor and a user interface feature displaying whether the column in the dataset is continuous or categorical; and generate, through a processor, from the sample data, one or more heterogeneous predictive models, based on the rank ordered machine learning algorithms through one or more iterations.

9. The heterogeneous predictive models generator of claim 8, wherein the generated one or more heterogeneous predictive models for the dataset are deployed, wherein the deployment comprises:

dividing the dataset into smaller chunks based on the size of the dataset;

predicting an outcome of the target column; and persisting the outcome in the one or more distributed data warehouses, through a bulk data transferring tool.

10. The heterogeneous predictive models generator of claim 8, wherein the dataset constitutes a larger dataset stored in the one or more distributed data warehouses.

11. The heterogeneous predictive models generator of claim 8, wherein the one or more distributed data warehouses are communicatively coupled to the data processing engine through the high throughput distributed messaging system over the cluster computing network.

12. The heterogeneous predictive models generator of claim 8, wherein the identification of the one or more statistically independent columns comprises:

selecting, at least one continuous column associated with the target column, wherein association is determined through a first statistical test;

selecting, one or more categorical columns associated with the target column, wherein the association is determined through a second statistical test;

determining, one or more decile levels for the selected at least one continuous column and persisting one or more decile columns as new columns in the dataset; and selecting, at least one of one or more categorical columns, one or more decile columns or a target column as the one or more statistically independent columns.

13. The heterogeneous predictive models generator of claim 12, wherein the one or more decile columns are a decile level representation of values of each of the selected continuous columns.

14. The heterogeneous predictive models generator of claim 12, wherein:

the one or more statistically independent columns are independent of each other; and the independence of the one or more statistically independent columns are determined through a third statistical test.

15. A non-transitory computer-readable medium storing computer-executable instructions that, when executed by one or more computing devices, cause at least one of the one or more computing devices to:

for a machine learning problem, receive, at a data processing engine, a dataset comprising a plurality of columns comprising a target column associated with the dataset, from one or more distributed data warehouses;

classify, at a data processing engine, one or more columns associated with the dataset as a categorical column or a continuous column, based on a type of data or a distribution of data in the dataset;

choose between classifying the machine learning problem as a classification problem and classifying the machine learning problem as a regression problem based on whether the target column is a categorical column or a continuous column;

identify, at an analytical engine, one or more columns in the dataset as statistically independent columns, wherein the one or more statistically independent columns comprise one or more categorical columns and one or more continuous columns;

for at least one of the continuous columns identified as statistically independent, calculate a mean and a standard deviation;

extract, through a processor, extracted rows from the dataset, based on the mean and the standard deviation of at least one of the continuous columns identified as statistically independent;

select a percentage of the extracted rows as a sample dataset representing the dataset;

recommend, through a processor, one or more rank ordered machine learning algorithms to one or more users, wherein the recommendation is based on characteristics of the dataset; and generate, through a processor, from the sample dataset, one or more heterogeneous predictive models, based on the rank ordered machine learning algorithms through one or more iterations.

* * * * *